(12) United States Patent
Vlad et al.

(10) Patent No.: US 11,743,975 B2
(45) Date of Patent: Aug. 29, 2023

(54) LIGHT-BASED HEAT IN AN OBJECT

(71) Applicant: LightSpeed Technologies LLC, San Diego, CA (US)

(72) Inventors: Ovidiu Gabriel Vlad, Naperville, IL (US); Alexander J. Yarmie, Jr., Lovettsville, VA (US)

(73) Assignee: LightSpeed Technologies LLC, Keller, TX (US)

( * ) Notice: Subject to any disclaimer, the term of this patent is extended or adjusted under 35 U.S.C. 154(b) by 191 days.

(21) Appl. No.: 17/172,465

(22) Filed: Feb. 10, 2021

(65) Prior Publication Data

US 2021/0243851 A1    Aug. 5, 2021

Related U.S. Application Data

(63) Continuation of application No. 16/149,493, filed on Oct. 2, 2018, now Pat. No. 10,932,327.

(60) Provisional application No. 62/566,982, filed on Oct. 2, 2017.

(51) Int. Cl.
*H05B 6/00*      (2006.01)
*F21V 8/00*      (2006.01)
*G02B 6/10*      (2006.01)

(52) U.S. Cl.
CPC ............. *H05B 6/00* (2013.01); *G02B 6/0006* (2013.01); *G02B 6/0008* (2013.01); *G02B 6/102* (2013.01)

(58) Field of Classification Search
CPC .... A01N 43/82; C07C 311/24; C07D 271/06; G02B 6/0006; G02B 6/0008; G02B 6/102; H05B 6/00
USPC ........................................................ 392/407
See application file for complete search history.

(56) References Cited

U.S. PATENT DOCUMENTS 7,629,558 B2 * 12/2009 Petrenko ................. F01D 25/02
                                                       219/494
10,932,327 B2    2/2021 Vlad

FOREIGN PATENT DOCUMENTS

WO         2008077101 A1    6/2008
WO      WO2008077101     *  6/2008

OTHER PUBLICATIONS

PCT Search Report and Written Opinion from International Application No. PCT/US2018/053941 dated Dec. 4, 2018; 12 pages.

* cited by examiner

*Primary Examiner* — Dana Ross
*Assistant Examiner* — Joseph W Iskra
(74) *Attorney, Agent, or Firm* — Fitch, Even, Tabin & Flannery LLP

(57) ABSTRACT

An object has at least a first source of light secured thereto. At least a first light-bearing conduit operably couples to this source of light and also to at least a first heat-dispersion component that is also secured to the object. So configured, the heat-dispersion component responds to reception of light from at least the first source of light via at least the first light-bearing conduit by dispersing heat derived from the light.

15 Claims, 7 Drawing Sheets

LIGHT-BASED HEAT IN AN OBJECT

CROSS-REFERENCE TO RELATED APPLICATIONS

This application is a continuation of U.S. patent application Ser. No. 16/149,493, filed Oct. 2, 2018, which claims the benefit of U.S. Provisional Application No. 62/566,982, filed Oct. 2, 2017, which are incorporated by reference in their entirety.

This application is related to and co-owned U.S. patent application Ser. No. 16/133,363, entitled Light-Based Terrestrial Vehicle Network and filed Sep. 17, 2018, now U.S. Pat. No. 10,899,230, issued Jan. 26, 2021, which is incorporated by reference in its entirety herein.

TECHNICAL FIELD

These teachings relate generally to the conveyance of heat within man-made objects.

BACKGROUND

Supplemental heating finds numerous uses in modern man-made objects (including but not limited to aerospace vehicles, terrestrial and aquatic vehicles, non-vehicular human shelters, and man-wearable objects, to note but a few relevant examples). Such heating can serve to provide comfort to a living being or to provide a suitable operating environment or state to a given component or part of the man-made object.

Such heat is sometimes harvested from some component in the object that produces excess heat while operating in service of some primary function that does not involve creating heat. This source of heat may not be wholly sufficient in and of itself for all supplemental heating requirements and/or it may be difficult, impractical, or impossible to direct that heat to a desired location in the object.

In other cases such heat may be sourced by a dedicated heating element. Such an approach usually requires electricity to operate. While useful in some application settings, such an approach may fail to be wholly satisfactory in any of a variety of application settings. Furthermore, in some specialized application settings standard electrical conductor wiring practices can give rise to considerable electromagnetic interference (EMI). That EMI may be disruptive to other external systems and/or may make it easier for unauthorized entities to detect the presence and/or movement of the object.

BRIEF DESCRIPTION OF THE DRAWINGS

The above needs are at least partially met through provision of the light-based heat in an object concept described in the following detailed description, particularly when studied in conjunction with the drawings, wherein.

Figure 1:
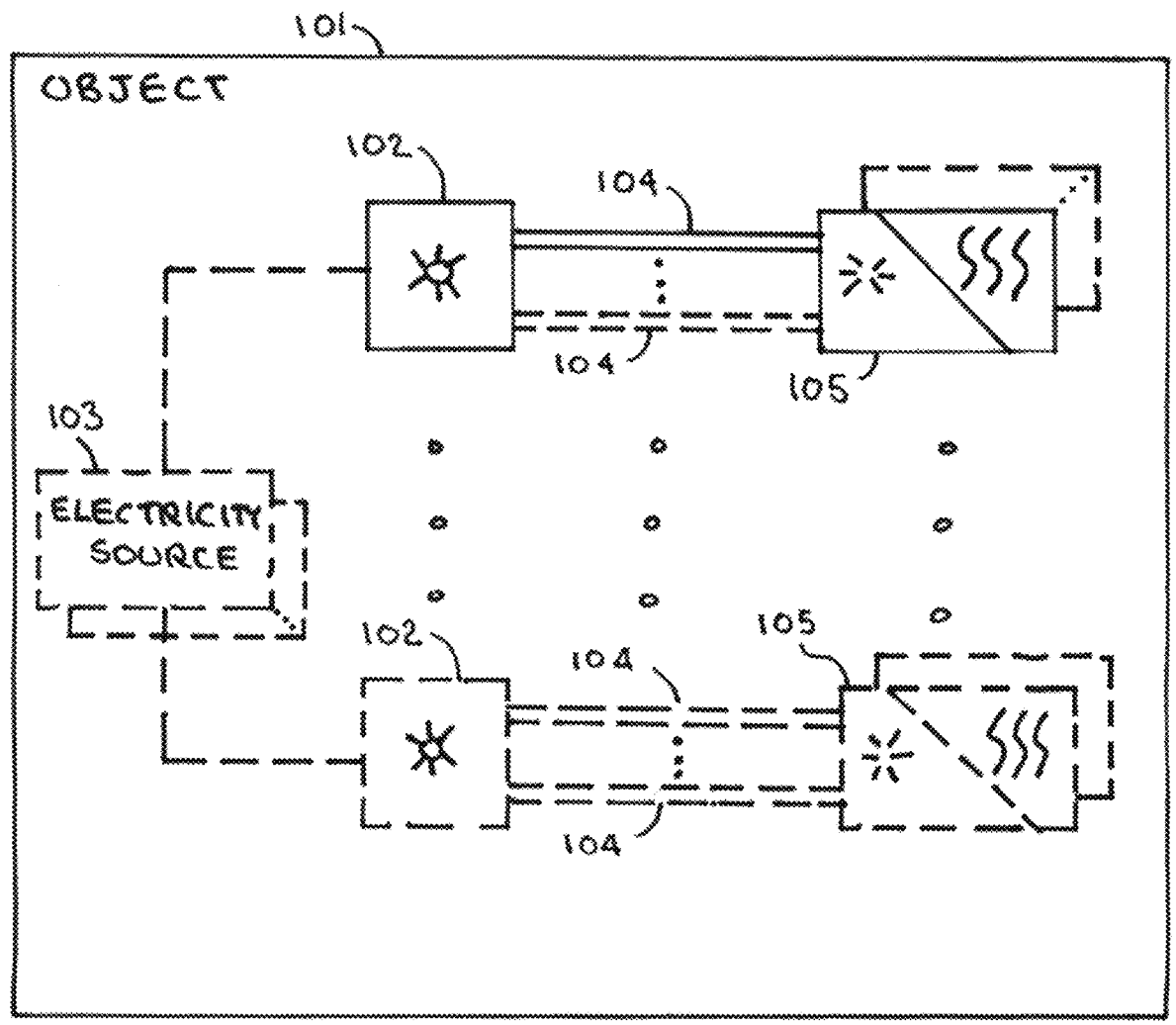
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments an object has at least a first source of light secured thereto. At least a first light-bearing conduit operably couples to this source of light and also to at least a first heat-dispersion component that is also secured to the object. So configured, the heat-dispersion component responds to reception of light from at least the first source of light via at least the first light-bearing conduit by dispersing heat derived from the light.

These teachings will accommodate a variety of man-made objects including, but not limited to, aerospace vehicles, terrestrial vehicles, aquatic vehicles, non-vehicular human shelters, and man-wearable objects. By one approach the source of light comprises an electrically-powered source of light and the light-bearing conduit comprises at least one optical fiber.

By one approach the heat-dispersion component includes a thermally-conductive element having a layer of light-absorptive (most commonly infrared-absorptive) material at least partially disposed thereon. So configured, the infrared-absorptive material generates heat when exposed to at least a part of the light emanating from the first light-bearing conduit. The heat-dispersion component can also include a connector to receive and hold the light-bearing conduit such that at least a part of the light that emanates from the light-bearing conduit illuminates at least a part of the infrared-absorptive material and corresponding heat is available via the thermally-conductive element. If desired, the first heat-dispersion component can further include at least one fan configured to disperse the heat from the thermally-conductive element to thereby heat a space corresponding to the object.

By another approach, in lieu of the foregoing or in combination therewith, a heat-dispersion component can include a light-to-electricity conversion component having a light-receiving input operably coupled via a light-bearing conduit to a source of light that is secured to the object. An electricity-providing output of this component can then operably couple to an electricity-to-heat conversion component. So configured, the latter can provide heat to thereby again heat a space corresponding to the object.

By one approach a temperature sensor can be configured to communicate sensed temperature information to a control circuit that serves to control the dispersal of heat by the aforementioned heat-dispersion component. By one approach, for example, the control circuit can selectively occlude the light path to the heat-dispersion component. By another approach, the control circuit can modulate the output of the source of light to selectively reduce or increase the strength of the light. By one approach communications between these components includes the transmission and reception of modulated light.

So configured, heat can be provided to general and/or very targeted and specific spaces and locations within a given object. These teachings are highly flexible in practice and will accommodate a wide variety of application settings. In many cases these benefits are achieved in a way that is less expensive and/or that requires less weight than corresponding prior art practices. For many application settings, heat provided via these teachings occurs more efficiently as compared to more typical electricity-based methodologies. Safety during operation is also typically increased while a corresponding EMI signature is reduced.

Referring now to FIG. 1, this figure presents an apparatus 100 that includes an object 101. These teachings are highly flexible in this regard and will accommodate a wide variety of objects. By one approach, the object 101 comprises an aerospace vehicle such as a manned or unmanned spacecraft, fixed wing aircraft, helicopter, and so forth. By another approach the object 101 comprises an aquatic vehicle configured to travel on the surface of or within a body of water.

As another example, the object 101 comprises a terrestrial vehicle. Terrestrial vehicles of various kinds are known in the art. As used herein, "terrestrial vehicle" refers to a vehicle that is physically configured to move from one place to another while in physical contact with the ground. As used herein, a vehicle is not a terrestrial vehicle merely because the vehicle can move while in contact with the ground when that capability constitutes only a secondary means of locomotion as compared to some primary non-terrestrial means of moving. Accordingly, an airplane is not a terrestrial vehicle notwithstanding an ability of the airplane to move while in contact with the ground. A non-complete listing of terrestrial vehicles would include automobiles, trucks, motorhomes, vans, fire engines, various earthmovers, motorcycles, tracked vehicles such as tanks, and railroad engines and cars.

As yet another example the object 101 can comprise a non-vehicular human shelter. Examples in these regards include both permanent/stationary shelters (such as residential, business, commercial, and industrial buildings) as well as mobile/portable shelters (including but not limited to tents and the like).

And as yet another example the object 101 can comprise a man-wearable object. Examples in these regards include but are not limited to outer footwear (such as shoes and boots), pants and skirts, shirts and blouses, dresses, coats and jackets of various kinds, gloves, socks and other undergarments, vests, scarves and other neckwear, headwear including hats and helmets, backpacks and other wearable containers, as well as various wearable accessories including eyeglasses, wristwatches and other bracelets, necklaces, and so forth.

These teachings will further accommodate objects 101 comprised of a wide variety of materials, including natural as well as man-made synthetic materials, rigid materials as well as flexible materials, and so forth.

The apparatus 100 also includes at least a first source of light 102. In this example the source of light 102 is secured to the object 101. By one approach, the first source of light 102 comprises an electrically-powered source of light such as a laser diode. When so configured, the apparatus 100 can further include at least one self-contained source of electricity 103 that may also be secured to the object 101. This self-contained source of electricity 103 operably couples to the one or more sources of light 102 to thereby provide electricity to the one or more sources of light 102. Examples of a self-contained source of electricity include but are not limited to batteries of various kinds, capacitors (including so-called super capacitors), as well as generators of various kinds. By one approach the self-contained source of electricity 103 is included with the object 101 to provide electric power to components other than the first source of light(s) 102).

The first source of light 102 may itself include a single, solitary light source or a plurality of discrete, independent light sources as desired. When multiple light sources are utilized they may be identical to one another or may differ from one another as regards any of power, intensity, light frequency, and so forth. When multiple light sources are utilized their output light may be combined into a single output that constitutes the output of the first source of light 102.

The light output by the first source of light 102 may be visible light, non-visible light (such as infrared light) only, or light having both visible and non-visible spectrum. As described in more detail below, visible light may serve a surface-illumination purpose and/or may serve as a visible marker to warn of an active light source (when, for example, the visible light component is conveyed in combination with a light component that conveys power as described herein). Infrared light, by way of contrast, can serve to transmit heat to a distal location.

The output(s) of the source of light(s) 102 operably couple to at least a first light-bearing conduit 104. So configured this light-bearing conduit 104 conveys light from the first source of light 102 to other locations and components corresponding to the object 101. In a typical application setting there will likely be a plurality of such light-bearing conduits 104 that attach respectively to one or more of the aforementioned sources of light 102.

By one approach at least some of the light-bearing conduits 104 comprise optical fiber comprised of, for example, a polymer-based plastic optical fiber or a plastic optical fiber having at least some polymer content.

The diameter/cross-section of a given light-bearing conduit 104 can vary to suit the needs of a particular application. For example, a light-bearing conduit 104 that serves to convey a larger amount of power (such as 15 watts or more) may have a larger diameter than a light-bearing conduit 104 that serves to convey a smaller amount of power (such as only 1 or 2 watts of power). Appropriate selections in these regards can be based, for example, upon the anticipated power requirements of the corresponding components that are to be powered. Illustrative examples in these regards include but are not limited to light-bearing conduits 104 having a diameter of 1.0 mm, 3.0 mm, 5.0 mm, 7.0 mm, or 15.0 mm. It is also possible to use a greater number of smaller-diameter conduits as versus a fewer number of larger-diameter conduits, or vice versa, to serve a similar aggregate purpose. For example, at least 16 watts of power can be conveyed by eight 1.0 mm conduits (presuming 2 watts per conduit), or by sixteen 1.0 mm conduits (presuming 1 watt per conduit), or three 3.0 mm conduits (presuming 6 watts per conduit).

If desired, at least some of the light-bearing conduits 104 can be provided, for at least a portion of their respective length, with supplemental, conformal, thermally-insulative cladding. Such cladding can serve to protect the operational and physical integrity of the conduit 104 in environmentally-challenging and/or operationally-challenging locations where extreme cold or heat may be anticipated. A cladding that is not especially thermally protective may be useful for light-bearing conduits 104 intended to bear power-conveying light.

In this illustrative example one or more of the light-bearing conduits 104 for operably couple to a light-receiving input of at least a first heat-dispersion component 105. In this example the heat-dispersion component 105 is also secured to the object 101. Generally speaking, the heat-dispersion component 105 is configured to respond to the reception of light from at least the first source of light 102 via at least the first light-bearing conduit 104 by dispersing heat derived from the light. In this example the light received by the heat-dispersion component 105 comprises, at least in part, infrared light.

These teachings will accommodate a variety of different heat-dispersion components. In a given object 101 there may be a plurality of heat-dispersion components 105 that are all essentially identical to one another or that at least operate in a similar manner to one another or there may be different kinds of heat-dispersion components 105.

Figure 2:
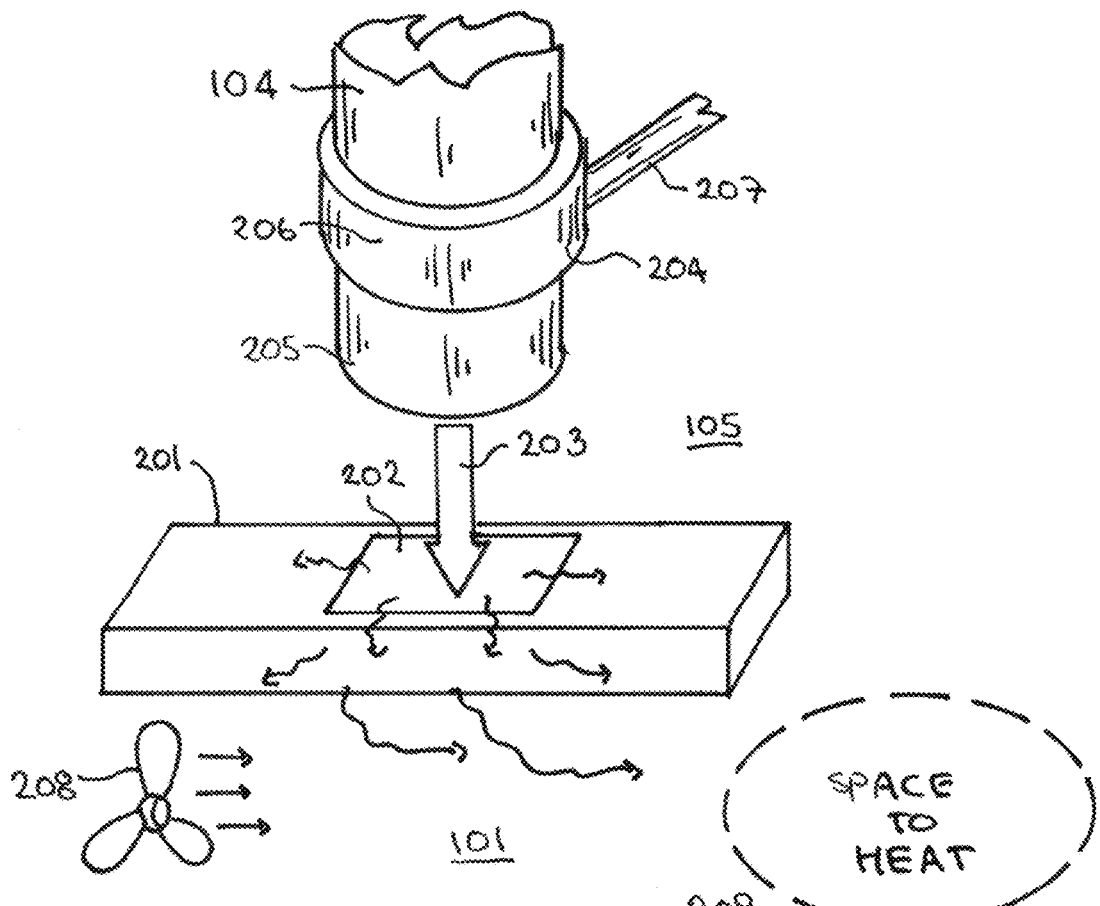
FIG. 2 comprises a perspective view as configured in accordance with various embodiments of these teachings.

FIG. 2 provides a first illustrative example in these regards. In this example the heat-dispersion component 105 includes at least a first thermally-conductive element 201. This thermally-conductive element 201 can have essentially any form factor of choice and is shown here as a small slab of aluminum. This thermally-conductive element 201 has a layer of infrared-absorptive material 202 at least partially disposed on a surface thereof. In this example the layer of infrared-absorptive material 202 as a rectangular shape but the shape can vary as desired and/or with respect to the needs and/or opportunities represented by a given application setting. Darker-colored materials may suffice, though the applicant has determined that copper-colored dyes (such as those used in film development) can be especially useful in these regards.

So configured, the infrared-absorptive material will generate heat when exposed to light 203, and especially infrared light, that may emanate from the above-described light-bearing conduit 104. To aid in those regards, the heat-dispersion component 105 in this example further includes a connector 204 that is configured to receive and hold the light-bearing conduit 104 at or near the tip 205 thereof such that at least a part of the light 203 emanating from the light-bearing conduit 104 illuminates at least a part of the layer of infrared-absorptive material 202.

In this example the connector 204 includes a metallic ring 206 that frictionally restrains movement of the light-bearing conduit 104. The ring 206 in turn connects to a stem 207 that is secured to some other stationary surface of choice. These teachings will accommodate any of a wide variety of ways of connecting to and holding the light-bearing conduit 104 in a desired position and orientation.

By another approach, an optical prism/taper attached to the tip 205 of the light-bearing conduit 104 can serve to output light from the light-bearing conduit 104 perpendicular to the longitudinal axis of the light-bearing conduit 104. Using this approach, the light-bearing conduit 104 can be disposed parallel (and very close) to the thermally-conductive element 201. Such an approach can offer space savings that are helpful in some application settings.

If desired, and as shown in FIG. 2, the heat-dispersion component 105 can further include at least one fan 208 configured to disperse the heat from the first thermally-conductive element 201 to thereby, for example, heat a space 209 that corresponds to the object 101.

Figure 3:
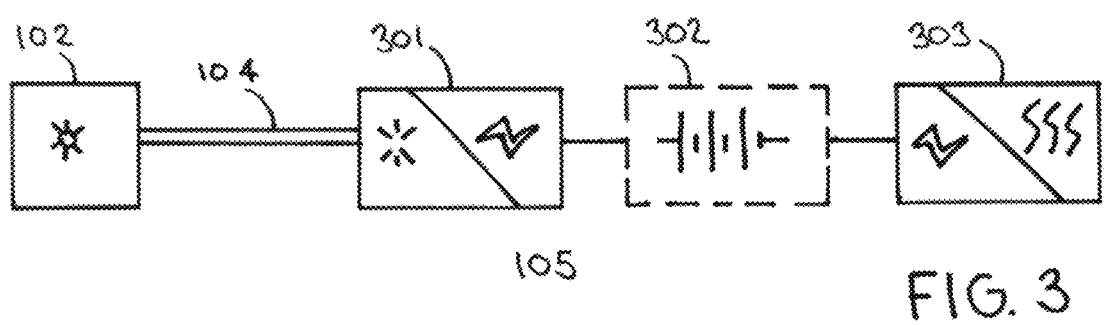
FIG. 3 comprises a block diagram as configured in accordance with various embodiments of these teachings.

FIG. 3 presents another approach for configuring a heat-dispersion component 105. In this example the light source 102 optically couples via at least one light-bearing conduit 104 to the light receiving input of at least one light-to-electricity conversion component 301. The light-to-electricity conversion component 301 is configured to convert at least some of the light received at the light-receiving input into electricity and to provide that electricity to at least one electricity-providing output. A variety of photonically-sensitive materials are known in the art that will serve in these regards, with gallium arsenide being one particularly useful example. For example, wafers of gallium arsenide ranging in diameter size from 1.0 to 7.0 mm can output from 1.0 to 3.3 volts at 7.0 to 20.0 watts with conversion efficiency generally ranging from twenty to eighty percent.

Additional components can be utilized as desired to smooth, regulate, and otherwise shape and control the resultant electricity. Generally speaking, the electricity provided by the light-to-electricity conversion component 301 constitutes direct current (DC) electricity. If desired, an inverter can serve to convert the DC electricity into alternative current (AC) electricity.

By one optional approach the electricity-providing output of the light-to-electricity conversion component 301 can operably couple to a self-contained electricity storage component 302 such as, for example, a battery or a capacitor. In any event, the electricity-providing output of the light-to-electricity conversion component 301 operably couples to an electricity-to-heat conversion component is configured to receive electricity and to provide heat to thereby provide heat a space corresponding to the object 101. If desired, a fan as described above can be utilized in conjunction with this heat-dispersion component 105 to facilitate directing the heat to the desired space.

As suggested above, a given apparatus 100 may utilize only one type of heat-dispersion component 105 with a given object 101 or may utilize two or more different types of heat-dispersion components 105 as desired. By one approach, two different types of heat-dispersion components 105 may be employed in conjunction with a shared space to heat in order to provide redundant capabilities in those regards.

Figure 4:
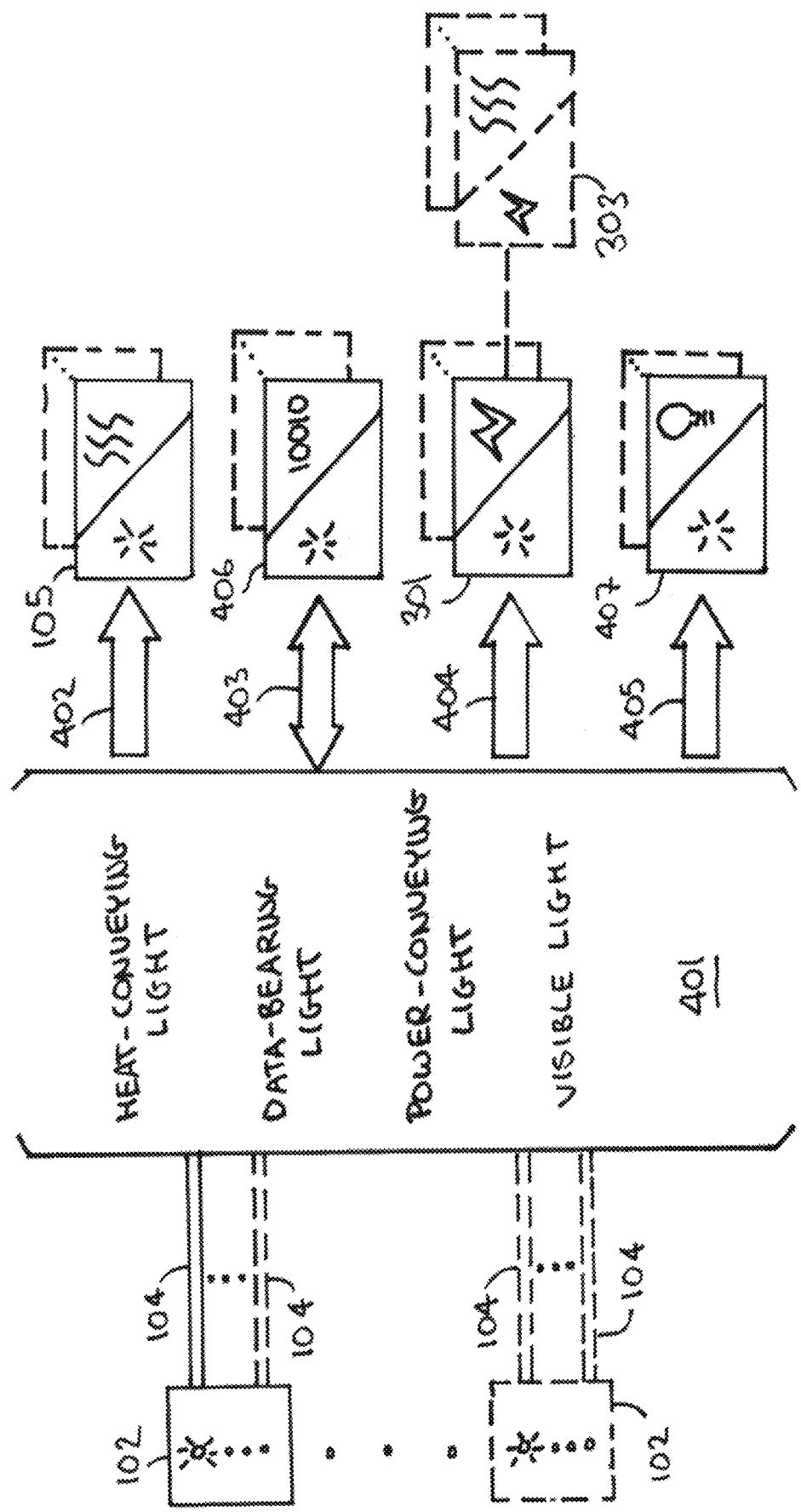
FIG. 4 comprises a block diagram as configured in accordance with various embodiments of these teachings.

By one approach such a light-based system can serve a wide variety of end purposes. FIG. 4 provides an illustrative example in these regards.

In this example one or more sources of light 102 provide any of a variety of different kinds of light 401. Examples include heat-conveying light (such as infrared light), data-bearing light, power-conveying light, and visible light. As described above, heat-conveying light 402 can facilitate the operating of a heat-dispersion component 105 as described above with respect to FIG. 2.

As another example, data-bearing light 403 can convey data to and/or from one or more data-capable components

406. The modulation of light in order to convey data comprises a well understood area of prior art practice. By one approach these teachings will accommodate one or more light-based data buses that convey only data-modulated light or that share data-modulated light with light intended for other purposes as desired.

Generally speaking the data handling protocol can comprise, if desired, a simple data handling protocol. Any of a wide variety of modulation techniques as are presently known (or that will likely be developed hereafter) can be employed in this regard as these teachings are not overly sensitive to specific selections amongst such options. By one approach, the data handling protocol can essentially comprise a direct one-for-one representation of the information to be conveyed with little or no error correction. (As used herein, those skilled in the art will understand and recognize that "error correction" serves as a reference to protocol-based error mitigation, error detection, and error correction, which concepts are well understood in the art and require no further elaboration here.)

These teachings will accommodate a wide variety of data-capable components 406. Generally speaking, a data-based component 406 will typically source, relay, process, receive, store, and/or use information. Examples include, but are certainly not limited to, the above-described heat-dispersion components 105, sensors of various kinds including temperature sensors, location-sensing equipment and global position system (GPS) receivers, wireless transmitters, radar and/or lidar, fuel level sensors, engine operational parameters, informational displays, environmental control sensors and actuators, and so forth.

As yet another example, power-conveying light 404 can be provided to a light-to-electricity conversion component 301 as described above to thereby electrically power one or more electricity-based components such as, but not limited to, the above-described electricity-to-heat conversion component 303.

And as yet another example, visible light 405 can be provided to any of a variety of illumination components 407. Illumination components 407 are components that are configured to provide surface illumination using visible light 405 as sourced by at least one source of light 102 as described above. This can include illumination components that are configured to provide interior surface illumination for the object 101 as well as illumination components that are configured to provide exterior surface illumination for the object 101. (Headlights are one useful example of an illumination component that provides exterior surface illumination. In that case, and as an illustrative example in these regards, a bundle of thirty 1.0 mm optical fibers can provide the lighting performance equivalent of a modern headlight, including both high beam as well as low beam settings.)

Those skilled in the art will understand that the foregoing description can be taken at face value as a physical configuration. It will also be understood, however, that the foregoing description can also be taken as a schematic representation and/or as a logical representation. In fact, these teachings will accommodate a variety of network architectures including star-shaped configurations, ring networks, and so forth.

Figure 5:
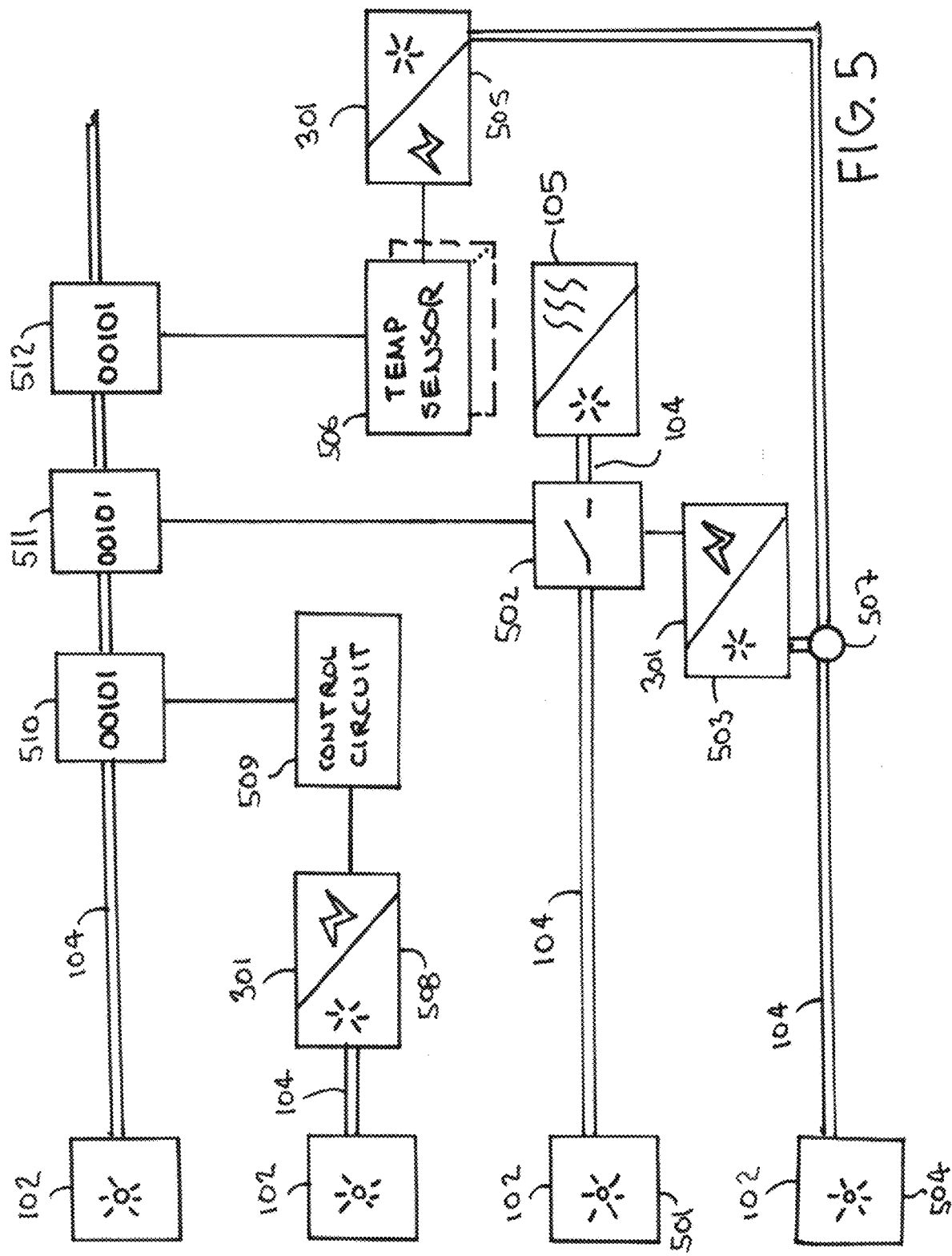
FIG. 5 comprises a block diagram as configured in accordance with various embodiments of these teachings.

It will also be understood that these teachings will accommodate a variety of other components, including components that together form a feedback-based control system. For example, one or more temperature sensors, in combination with one or more control circuits, can serve to control the amount of heat provided to a particular object space 209. FIG. 5 presents one illustrative example in these regards. It will be understood that the specific details of this example are intended to serve an illustrative purpose and are not to be taken as suggesting any particular limitations in these regards.

In this example a first light source 501 provides at least infrared light via a corresponding light-bearing conduit 104 to a heat-dispersion component 105 as described above. In this example, however, the light-bearing conduit 104 includes a gate 502 that can selectively occlude the conduit 104 to thereby control whether the light reaches the heat-dispersion component 105.

In this example a first light-to-electricity conversion component 503 provides electrical power to the aforementioned gate 502. Light to power this first light-to-electricity conversion component 503 is sourced by a second light source 504. This same second light source 504 also powers a second light-to-electricity conversion component 505 which, in turn, provides electrical power to at least one temperature sensor 506 described below. The corresponding light-bearing conduit 104 includes a light splitter 507 to facilitate providing sufficient light power to both the first and the second light-to-electricity conversion components 503 and 505. Light splitters are known in the art and require no further elaboration here.

In this example, a third light-to-electricity conversion component 508 provides operating electricity to a control circuit 509. Being a "circuit," the control circuit 509 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 509 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 509 may be configured (for example, by using corresponding programming as will be well understood by those skilled in the art) to carry out one or more of the steps, actions, and/or functions described herein.

In this example the control circuit 509 also operably couples to a first data bus interface 510. This data bus interface 510 comprises, in this example, an optical data bus interface and, more particularly, a polymer optical data bus interface that is suitable for use in conjunction with polymer optical fiber-based data busses. If desired, this data bus interface can comprise a full-duplex optical data bus interface. By one approach, the data bus itself will comprise a ring-configured data bus. In such a case, this first data bus interface 510 can comprise a ring interface. If desired, this first data bus interface can be configured and arranged to transmit substantially similar data (including identical data) in opposing directions of such a ring-configured data bus substantially simultaneously. If desired, the data-bearing light can share a same light-bearing conduit (or conduits)

104 as the above-described heat-conveying light, power-conveying light, and/or visible light.

So configured the control circuit 509 can communicate with other elements via the first data bus interface 510. In particular, in this example the control circuit 509 can provide open and close instructions to the aforementioned gate 502 via a second data bus interface 511 and can receive temperature information from the aforementioned temperature sensor(s) 506 via a third data bus interface 512

The temperature sensor 506 can comprise any of a variety of temperature sensors that are known in the art. As the present teachings are not overly sensitive to any particular selections in these regards, further elaboration regarding various temperature sensors is not presented here for the sake of brevity. In a typical application setting, the one or more temperature sensors 506 will typically be located in a favorable position to sense the temperature at or within a space of interest in the object 101.

So configured, the control circuit 509 can control the dispersal of heat by the heat-dispersion component 105 as a function, at least in part, of the at least one temperature sensor 506. In particular, the control circuit 509 can switch the aforementioned gate 502 to be open when an increase in temperature is desired. Conversely, the control circuit 509 can switch the aforementioned gate 502 to be closed when a decrease in temperature is acceptable.

In lieu of the foregoing use of a gate 502, or in combination therewith, the control circuit 509 can instead be communicatively coupled (via, for example, the above-described data buss(es)) to the source of light 501 that services the heat-dispersion component 105. So coupled, the control circuit 509 can control the light output of the source 501 to thereby control the amount of heat provided by the heat-dispersion component 105. For example, the amplitude/intensity of the output light could be controlled/modulated to achieve this result. This approach may be favored in some application settings as a most efficient and economical use of available electric power.

It should again be recalled that the specific details of these examples serve an illustrative purpose and are not intended to suggest specific limitations to these teachings. For example, as illustrated, the control circuit 509 and the temperature sensor 506 are presented as being physically separate from one another. These teachings will readily accommodate, however, co-locating these elements into a single shared component, such that the temperature sensor 506 can act upon its own sensed temperatures (with or without also taking into account other temperature data as sensed and provided by other temperature sensors) as a self-contained thermostat to control the heat-dispersion component 105 as described above.

As yet another example in these regards, the temperature sensor 506 can be provided with its own control capabilities while also working in conjunction with a separate control circuit 509 as described above. In this case the thermostatic capabilities of the temperature sensor 506 can be used, for example, as a safety-backup to prevent inappropriate overheating while the control circuit 509 can operate to maintain the temperature-based comfort of the user.

If desired, a manual kill switch (not shown) can be provided to disable the provision of heat by the heat-dispersion component 105. Such a kill switch can serve to switch off the supply of electric power to the corresponding source of light 501.

By one approach, if desired, the source of light 102 can also serve to provide and combine a safety-pilot wavelength component with any power wavelength component and/or heat-conveying wavelength component. So configured, and particularly when the power and/or heat-conveying wavelength component comprises a substantially or fully non-visible wavelength (such as an infrared wavelength) as described above, this safety-pilot wavelength component (which can comprise a visible light of choice) can serve to warn onlookers to avoid looking into the light output while also serving to invoke a reflexive closure of the pupil in order to afford some degree of natural eye protection as well.

In lieu of the foregoing, or in combination therewith, that safety-pilot wavelength component can provide the basis for a continuous (or nearly continuous) test on the optical conduit to determine the presence or absence of that safety-pilot wavelength component. Such a test may comprise, for example, measuring the propagation delay that corresponds to reflections that occur at the receiving end of the optical conduit. Such a test can help to identify when a break or leak in the optical conduit occurs. Upon detecting such a breach in the operational integrity of the optical conduit the supply of light can be automatically switched off (or possibly diverted to a back-up optical conduit).

It may also be again noted that the power-conveying light can be carried by a same light-bearing conduit 104 (or conduits) that also carries any data-bearing light, heat-conveying light, and/or visible light as desired.

Figure 6:
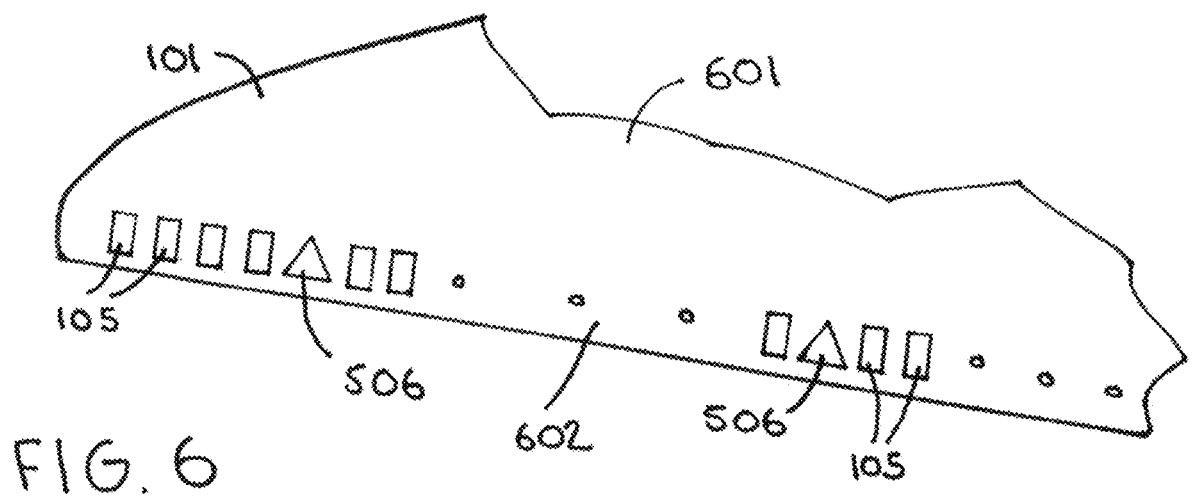
FIG. 6 comprises a block diagram as configured in accordance with various embodiments of these teachings.

FIG. 6 presents an illustrative example where the object 101 comprises an aircraft wing 601. In this example a plurality of heat-dispersion components 105 are mounted along the leading edge 602 of the wing 601. Temperature sensors 506 are interspersed amongst the heat-dispersion components 105. These elements 105 and 506 are connected as described above. So configured, the heat-dispersion components 105 can be selectively energized to effect a de-icing function.

Figure 7:
FIG. 7 comprises a perspective view as configured in accordance with various embodiments of these teachings.

FIG. 7 presents another example where the object 101 comprises a man-wearable item; in particular, a boot 701. In this example three heat-dispersion components 105 are disposed within or on the sole of the boot 701. Temperature sensors may also be included if desired. In this example the boot 701 includes a connection block 702. This connection block serves to physically and optically couple to one or more light-bearing conduits to the heat-dispersion components 105 (and temperature sensors if included). Using this approach the light source(s) 102 (and other related elements such as the above-described controls 509) can be mounted elsewhere on the person who wears the boot 701.

Man-wearable items can of course comprise articles other than footwear as described above. The heating systems provided in each wearable item can be independent or can be coupled into an overall network that operably couples multiple wearable items. Using this approach, one or more light sources could be contained within a backpack and with light from those light sources being carried by corresponding light-bearing conduits to various other wearable items.

These teachings are highly flexible in these regards and will facilitate various purposes. As one example in these regards, an item of clothing, such as a coat, can have a warming compartment where food items are placed to be warmed by one or more heat-dispersion components prior to consumption.

Figure 8:
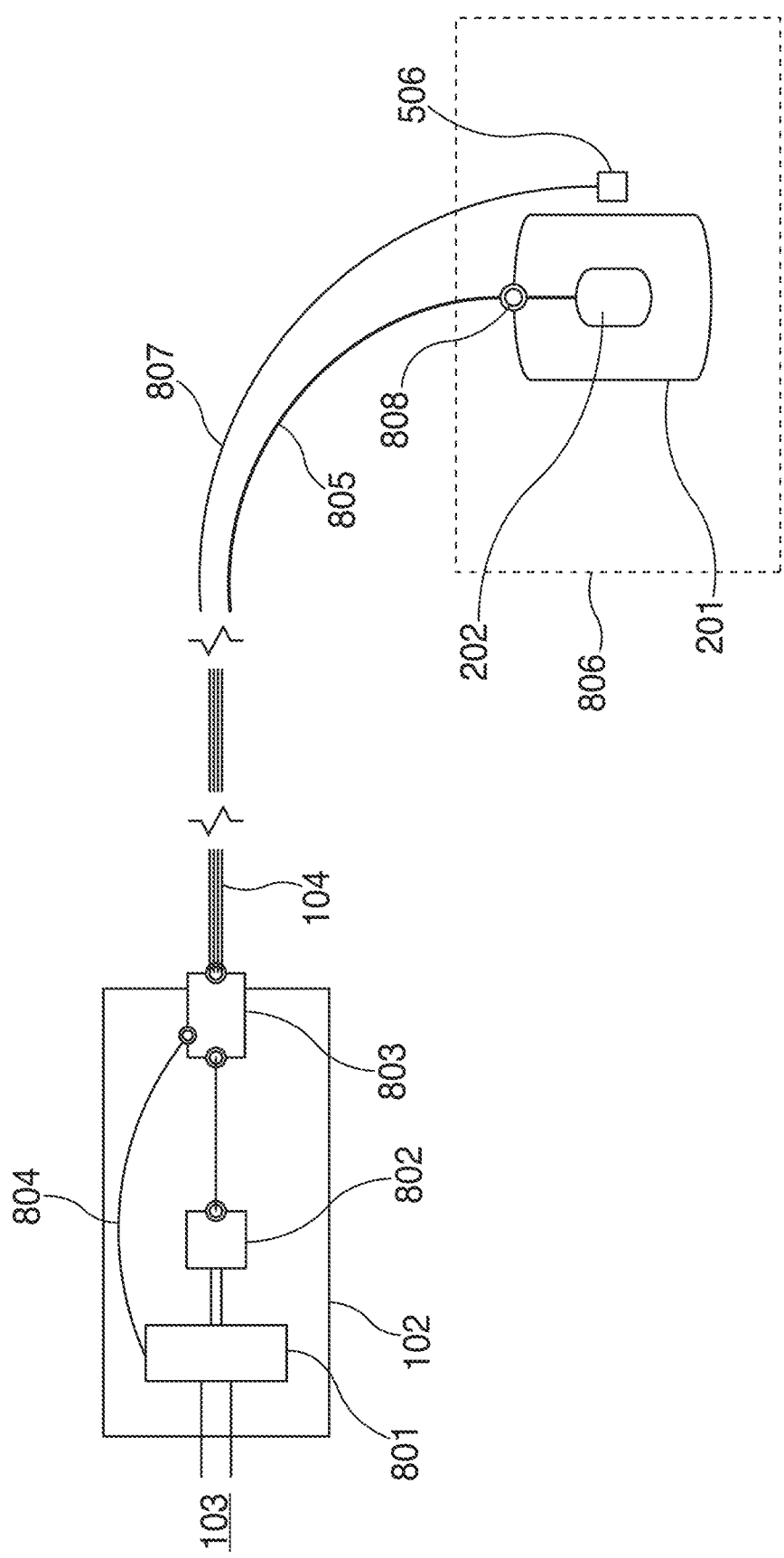
FIG. 8 comprises a block diagram as configured in accordance with various embodiments of these teachings.

FIG. 8 presents another illustrative example that draws upon various teachings set forth herein and that presents further details by way of illustration and without intending to suggest any particular limitations.

In this example the source of light 102 includes a diode-based laser driver 801 that connects to an electricity source 103. An electric power output of the laser driver 801 connects to an infrared laser diode 802. An optical conduit directs the resultant photonic energy to an optical port 803 that comprises the output of the source of light 102. In this example an additional optical conduit 804 provides temperature data feedback as received at the optical port 803 to the laser driver 801. In this example, the laser driver 801 is configured to respond to that temperature data feedback by controlling the provision of electricity to the laser diode 802.

One or more light-bearing conduits 104 couple to the aforementioned optical port 803. These conduits include an optical conduit 805 that carries light-based energy to a heating section 806 and also an optical conduit 807 that carries temperature data from a temperature sensor 506 that comprises a part of the heating section 806. The energy-bearing conduit 805 couples to an optical coupling 808 that directs the infrared light to the infrared absorptive material 202 described above. That infrared absorptive material 202 in turn conveys the resultant heat to a thermally-conductive element 201.

Figure 9:
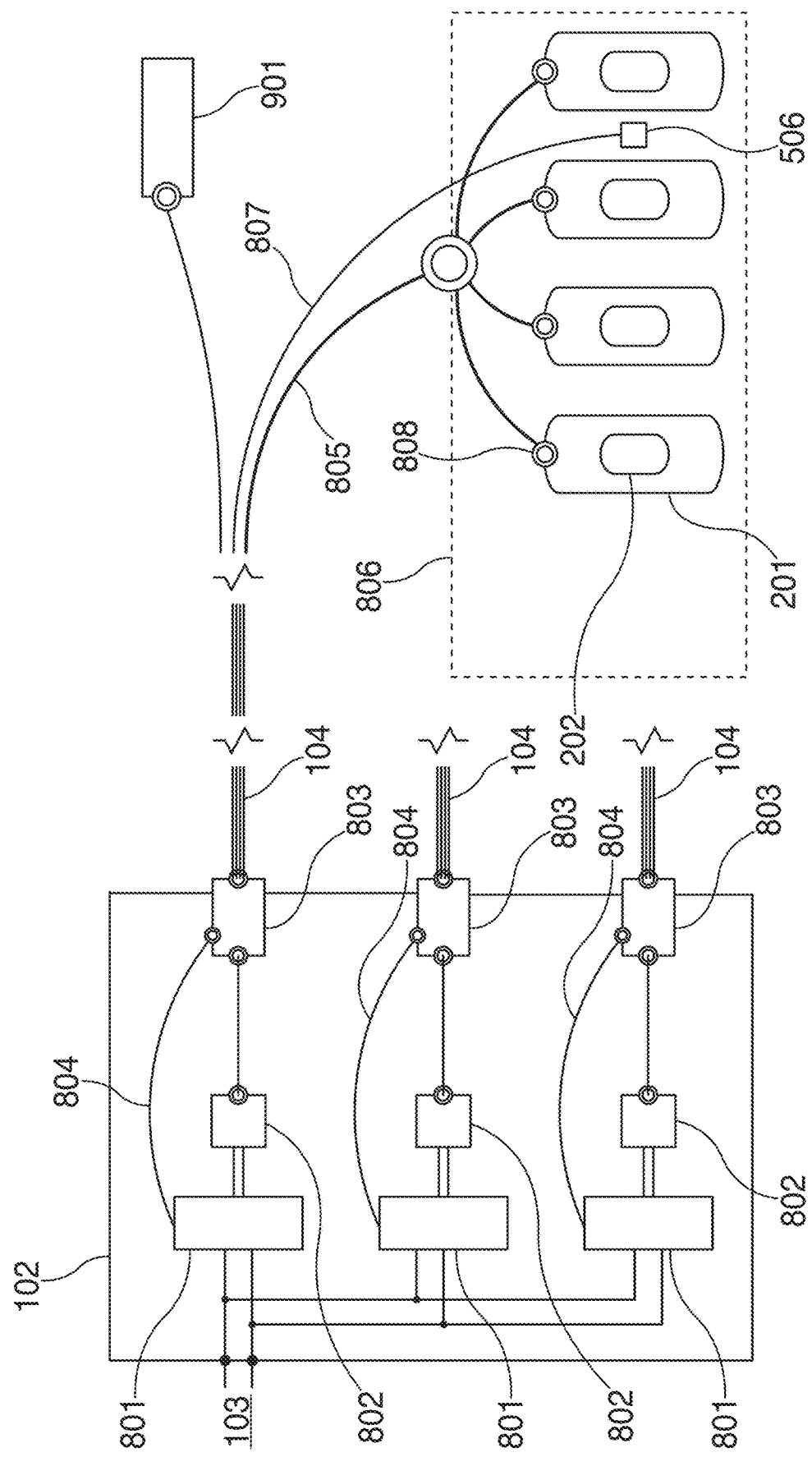
FIG. 9 comprises a block diagram as configured in accordance with various embodiments of these teachings.

FIG. 9 presents an example that is similar to the example described in FIG. 8 but where the source of light 102 includes three of the infrared lasers 802 and their corresponding components. So configured, the source of light includes three separate output optical ports 803. Also in this example, the thermal energy from one of the laser diodes 802 is split and distributed amongst four separate heat-dispersion components that comprise the heating section 806. And lastly, this example includes a thermostat 901 that optically couples to a corresponding laser driver 801. In this example the thermostat 901 controls the overall temperature within the entirety of the object or space, while the temperature sensor 506 primarily serves to provide thermal protection against overheating of the heat-dispersion component(s).

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An apparatus comprising:
   an object;
   at least a first source of light secured to the object;
   at least a first light-bearing conduit operably coupled to the first source of light;
   at least a first heat-dispersion component secured to the object and operably coupled to at least the first light-bearing conduit and configured to respond to reception of light from at least the first source of light via at least the first light-bearing conduit by dispersing heat derived from the light;
   wherein the light received by the first heat-dispersion component comprises, at least in part, infrared light; and
   wherein the first heat-dispersion component comprises:
      at least a first thermally-conductive element;
      a layer of infrared-absorptive material at least partially disposed on a surface of the thermally-conductive element, wherein the infrared-absorptive material generates heat when exposed to at least a part of light emanating from the first light-bearing conduit;
      a connector to receive and hold at least the first light-bearing conduit such that at least a part of the light emanating from the first light-bearing conduit illuminates at least a part of the infrared-absorptive material and corresponding heat is available via the thermally-conductive element.

2. The apparatus of claim 1 wherein the first source of light comprises an electrically-powered source of light.

3. The apparatus of claim 2 further comprising:
   a self-contained source of electricity secured to the object and operably coupled to the first source of light to provide electricity to the first source of light.

4. The apparatus of claim 1 wherein the first light-bearing conduit comprises at least one optical fiber.

5. The apparatus of claim 1 wherein the first heat-dispersion component further comprises:
   at least one fan configured to disperse the heat from the first thermally-conductive element to thereby heat a space corresponding to the object.

6. The apparatus of claim 1 further comprising:
   a light-to-electricity conversion component having:
      a light-receiving input operably coupled via a light-bearing conduit to a source of light that is secured to the object; and
      an electricity-providing output.

7. The apparatus of claim 1 further comprising:
   at least a second heat-dispersion component secured to the object, wherein the second heat-dispersion component includes:
      a light-to-electricity conversion component having a light-receiving input operably coupled via a light-bearing conduit to a source of light that is secured to the object and an electricity-providing output; and
      an electricity-to-heat conversion component operably coupled to received electricity from the light-to-electricity conversion component and configured to provide heat to thereby heat a space corresponding to the object.

8. An apparatus comprising:
   an object;
   at least a first source of light secured to the object;
   at least a first light-bearing conduit operably coupled to the first source of light;
   at least a first heat-dispersion component secured to the object and operably coupled to at least the first light-bearing conduit and configured to respond to reception of light from at least the first source of light via at least the first light-bearing conduit by dispersing heat derived from the light;
   at least one temperature sensor;
   a control circuit operably coupled to the at least one temperature sensor and configured to control dispersal of heat by the first heat-dispersion component as a function, at least in part, of the at least one temperature sensor;
wherein the at least one temperature sensor is configured to communicate sensed temperature information with the control circuit via a modulated light signal.

9. The apparatus of claim 8 further comprising:
   at least one light-bearing conduit operably coupled between the temperature sensor and the control circuit and configured to bear the modulated light signal.

10. The apparatus of claim 1 wherein the object comprises an aerospace vehicle.

11. The apparatus of claim 10, wherein the first heat-dispersion component is configured to constitute a deicer for at least one portion of a wing of the aerospace vehicle.

12. The apparatus of claim 1 wherein the object comprises a non-vehicular human shelter.

13. The apparatus of claim 1 wherein the object comprises a man-wearable object.

14. The apparatus of claim 13 wherein the man-wearable object comprises a plurality of physically discrete man-wearable objects.

15. The apparatus of claim 1 wherein the object comprises at least one of a terrestrial and an aquatic vehicle.

* * * * *